United States Patent Office 3,509,063
Patented Apr. 28, 1970

3,509,063
OPTICALLY DENSE FLUID AND METHOD OF MAKING THE SAME
Dwight Maxwell Teague, Detroit, Edward H. Loeser, Bloomfield Township, Oakland County, and Herbert J. Doppke, Detroit, Mich., assignors to Chrysler Corporation, Highland Park, Mich., a corporation of Delaware
No Drawing. Continuation-in-part of abandoned application Ser. No. 156,535, Dec. 1, 1961. This application Aug. 14, 1967, Ser. No. 660,209
Int. Cl. F21v 9/08; G02b 5/24, 17/00
U.S. Cl. 252—300      26 Claims

ABSTRACT OF THE DISCLOSURE

A light absorbing optically dense fluid for rear view mirrors requiring control of incident light to be reflected by them. The fluid is a substantially stable colloidal suspension of carbon black particles of an average size under twenty milli-microns dispersed in a solution of an organic liquid and a dispersing agent for the carbon black particles. Examples of dispersing agents are uncured rubbers and certain condensation products of high molecular weight carboxylic acids with polyamines or glycols such as triamides of polyisobutenyl propionic acids and long carbon chain esterified alkenyl succinic acids, and examples of diluents and solvents for the agent and liquid phase for the suspension are kerosene and other oils having a refractive index in the order of magnitude of glass. The carbon black particle concentration should not exceed about 23% by weight of combined carbon black particles and dispersing agent and the latter is associated with the carbon black particles as a surface active substance stabilizing the colloidal suspension thereof.

---

This application is a continuation-in-part of our application Ser. No. 156,535 filed Dec. 1, 1961 and now abandoned.

PRIOR ART

The closest art has no suggestion of the invention. At best it may be said that a rubber base paint as in Cox 1,824,771 has had carbon black included whereby to block certain light rays in a solid rubber paint coating as distinguished from a liquid mass, to inhibit cracking of the set rubber paint on exposure and Canadian Patent 592,974 to Bauer et al., teaches incorporating a copolymer in lubricating oils to disperse crankcase sludge and carbon black produced in operation of engines. Rabinow et al. 3,000,262 discloses a fluid type mirror but leaves to conjecture the specific nature of an operable fluid.

The invention is particularly concerned with fluid compositions for vehicle anti-glare rear view mirrors comprising a window and a mirror movable relative to the window and between which the fluid may provide an opaque screen to inhibit light reflections from the mirror under certain conditions of operation and permit light reflection under others. The invention is specifically directed to carbon black particle colloidal dispersions for these purposes.

A constant problem in motor vehicle operation has been the annoyance caused the driver by the glare of bright lights shning at night in the rear view mirror attached thereto and which are reflected into the driver's eyes. Under night time driving conditions these reflections especially of headlights of other moving cars are not only annoying but may become blinding and, therefore, dangerous. In Patent No. 3,198,070 to George E. Platzer, Jr. and Leonard P. Gau entitled "Rear View Mirror" there is disclosed a mirror device for alleviating this problem. The device comprises an enclosure having a clear glass window and a movable mirror operable in an optically dense fluid. In the daytime position of the mirror, the latter is in juxtaposition to the window with only a thin film of the liquid intervening. Light entering the window passes through the film and is reflected by the mirror. In the night position of the device the mirror is moved further away from the window to permit a substantial layer of the fluid to flow into the space between them and produce an opaque screen in front of the mirror to inhibit the reflection of light therefrom.

The present invention is directed to and it is the principal object thereof to provide an optically dense fluid and method of making the same capable of meeting the foregoing objectives and which will be dependable and constant in carrying them out.

Other objects are to provide a fluid which in addition to providing a proper degree of opacity will preferably, be stable in sunlight; not settle out in clumps of globules on the mirror or window after repeated operations and after long periods of use; have a chemical inertness toward the other components of the mirror structure in particular those of rubber-like elastomeric material with which the fluid comes in direct contact, such as seals and expansion elements; have a low vapor pressure at high summer temperatures and be non-freezing and liquid at extreme winter temperatures.

A particular object is to provide an optically dense fluid for mirror applications whose opacity is preferably such that a thin film or layer of the same of the order of 0.0015 inch thickness and less covering the mirror or reflector in its daylight or bright position will permit light to pass through it to the mirror and be reflected therefrom and pass back out through the fluid without suffering a loss by absorption of greater than about 15%. Moreover, the opacity of such fluid will preferably be such that the intensity of any reflection from the mirror in the night or extinct position of the mirror with a layer of such fluid in the order of 0.125 inch thickness masking the same, and with a beam of twenty foot-candles directed to the mirror will be less than that perceptible by the average human eye, i.e., less than an amount (which is in the order of 10 microlamberts) constituting the threshold of photopic vision. Stated another way the intensity of light reflected by the mirror in the night position should be but a minute part of the intensity of light reflected by the air-glass interface of the mirror window (the latter being less than 4% of the intensity of the incident ray passing through the window to the mirror) and preferably substantially zero, such that no reflections emanate from the mirror.

Furthermore, some drivers are annoyed at night by minor reflections projected by the glass-fluid interface of the window. Such may be substantially avoided where the fluid has an index of refraction in the order of that of the window glass. Accordingly this too is a desirable attribute of the fluid of the invention and an important object thereof.

Other objects and advantages of the invention will appear from the following description and from the claims.

We have discovered after much experimentation that stable colloidal dispersions or suspensions of carbon black in a suitable liquid base will provide the properties deemed essential for meeting the objectives of the invention. The carbon black may be any suitable carbon black such as lampblack, furnace black and channel black, but preferably used is the so-called "color" black, carbon black. The latter is preferably used because it is constituted of agglomerates of individual particles held together by high surface energy, which individual particles are of much smaller size (6 to 20 milli-microns in diameter, average size) as distinguished from agglomerates of the other carbon blacks whose individual particles are generally in the range of 20 to 300 milli-microns, average size. When the agglomerates of the finer size particles are reduced substantially to individual particles in accordance with the present invention they produce suspensions providing maximum opacity per unit weight. Moreover, when processed in accordance with the present invention they produce more stable suspensions than do the larger particles which is important for rear view mirror applications in which cases they avoid the formation of chunks or agglomerates of particles which may settle out on the mirror where the lesser stable suspensions employing the larger particles are used and which would be objectionable. Optimum results will be obtained when the average size of the individual particles are under 20 millimicrons, average size.

Carbon black particles do not readily form stable suspensions in liquids. However we have found it possible to successfully prepare stable suspensions of satisfactory opacity by homogenizing, shaking or ball-milling carbon black with liquids containing appropriate dispersants capable of associating with the carbon black particles as a surface active agent. Thus it has been found essential to employ some form of dispersant or of wetting agent to effectively get the carbon black particles into suspension and retain them in suspension. In some instances premulling or milling of the dispersant and carbon black particles into a substantially homogeneous mass will assist materially in obtaining a stable colloidal suspension. The specific dispersant to employ will depend upon the use to which the fluid is to be applied. Such will be evident from the examples hereinafter described. For mirror uses natural and synthetic rubber and certain dispersants which are condensation products of high molecular weight carboxylic acids with polyamines or glycols are particularly useful. Both possess the ability among other properties to substantially inhibit staining or spotting of the mirror even when subjected to long time high temperature (above 100° F.) and strong ultraviolet light exposure, the condensation products appearing to be superior in this regard.

The liquid used as the continuous liquid phase or dispersion medium of the colloidal suspension is also important and must be selected with care to be compatible with the dispersant and vice versa. The liquids may be hydrocarbons, such as kerosene, benzene, toluene, trichloroethylene purified paraffinic hydrocarbons such as decane and dodecane or polar fluids, such as, water-glycol mixtures. Suspensions made with some of these liquids are less stable on aging tests and are less likely to provide the long-time stability required for a fluid suspension to be used for rear view mirror applications. However, they have other applications. Furthermore, although all of these suspensions may be adequately stable for particular applications those employing the preferred dispersants provide the most stable suspensions and are found best for rear view mirror applications.

A satisfactory substantially indefinitely stable suspension or dispersion of carbon black particles in a fluid may be obtained by combining with the carbon black particles as a dispersant therefor natural or synthetic rubbers and employing a liquid, in which the rubber dispersant is soluble as the continuous liquid phase. Thus we have discovered that if a quantity of carbon black particles such as described above and within the limits hereafter stated are sufficiently milled into an uncured natural or synthetic rubber and the compounded rubber be suspended in a liquid phase in which the rubber component becomes dissolved, that stable suspensions of carbon black particles and having a wide range of opacity may be obtained. It is found that in the milling operation the mass of carbon black particles is completely dispersed in the rubber so as to be separated into individual particles and that when the resulting rubber sheet is cut up into small pieces and agitated in the liquid phase which is a solvent therefor that the rubber, although dissolved, is believed to be associated with the carbon black particles and to constitute a high molecular weight polymer that additionally serves as a collidal stabilizer for the carbon black particles in the suspension. The rubber is believed to inhibit the formation of agglomerates of carbon black particles which may settle out and render the fluid objectionable in some applications and to assist the suspension to withstand changes in temperature and the effects of ultraviolet light which could affect stability.

As stated, the described procedure will make stable suspensions having a wide range of opacity ranging from light-colored fluids to dense black ones. The opacity of the suspensions will depend upon the carbon black particle concentration in the liquid phase and it will be possible by the described procedure to prepare base compositions of a dense character and syrupy nature and to subsequently reduce the opaqueness of the composition by thinning with the same or another solvent without destroying the suspension of carbon black particles or adversely affecting its stability. For example, to illustrate the differences in opaqueness possible if 5 grams of the master batch hereinafter described in Example 1 is dissolved in 100 milli-liters of kerosene a suspension will result having 0.192 gram of carbon black per 100 liters of suspension. It is a stable very opaque fluid of syrupy consistency having a light absorption coefficient ($\mu$) of approximately 212 in.$^{-1}$. When diluted with kerosene it provides less opaque but still stable fluids. For instance when diluted to contain only 0.0154 gram of carbon black per 100 milliliters of suspension its coefficient ($\mu$) is only 42 in.$^{-1}$.

Rubber ingredients especially useful as dispersants for the carbon black particles are the uncured copolymers of butadiene and styrene generally referred to as GR–S rubbers; uncured natural rubbers; the uncured copolymers of isobutylene and isoprene generally referred to as butyl rubbers; the uncured poly acrylic rubbers which are copolymers of an acrylic acid ester and a halogen containing derivative; the uncured butadiene-acrylonitrile rubbers generally referred to as Buna N or NBR rubbers; uncured chlorosulfonated polyethylene rubbers; uncured urethane rubbers, uncured polyisoprene rubbers and uncured isobutylene polymer rubbers.

The GR–S and natural rubbers are most desirable for mirror applications because they are soluble in kerosene producing therewith exceptionally stable suspensions resistant to extreme heat and cold, and ultra-violet light and which provide maximum opacity per unit weight of carbon black. Moreover they make possible low cost mirror structures and inexpensive conventional liquid seals of neoprene and the like. Many of the other rubbers especially those useful where high temperature resistance is a factor require the use of aromatic hydrocarbons or chlorinated solvents for their liquid phases for best results and the use of special liquid seals such as those of a copolymer of hexafluoropropylene and vinylidene fluoride ("Viton" produced by E. I. du Pont Company); a copolymer of chlorotrifluoroethylene and vinylidene fluoride ("Kee F 3700" produced by FMC Corporation) or a copolymer of hexafluoropropylene and vinylidene fluoride ("Fluorel" produced by Minnesota Mining and Manufacturing Company).

An example of a GR–S rubber is GR–S No. 1703, a product of Goodrich-Gulf Chemicals, Inc. and of other manufacturers. It is known to be a mixture of 100 parts of a copolymer of butadiene and styrene and 25 parts of a naphthenic processing oil. This material contains 22.5 to 24.5% bound styrene, between 4.5 to 6.3% of organic acid and between 1 to 1.75% stabilizer. It has a Mooney viscosity ML4 at 212° F. of between 50 to 65. An example of natural rubber is No. 1 Smoked Sheet. An example of a butyl rubber is Butyl 400, a product of Polymer Corporation, Ltd., and other manufacturers. It has 2.9 mol percent unsaturation, a specific gravity of 0.92 and a Mooney viscosity ML8 at 212° F. of about 45. An example of a polyacrylic rubber is Hycar 4021, a product of B. F. Goodrich Chemical Company and other manufacturers. An example of a Buna N rubber is Hycar 1051, also a product of B. F. Goodrich Chemical Company and others. An example of the chlorosulfonated polyethylene rubbers is Hypolon 40, a product of E. I. du Pont. An example of a urethane rubber is Genthane S, a product of General Tire and Rubber Company and others. An example of a polyisoprene rubber is Ameripol SN, a product of B. F. Goodrich Chemical Company and an example of an isobutylene polymer rubber is Vistonex 303, a product of the Enjay Company.

Excellent stability and required opacity for fluid mirrors may also be obtained by the use of certain other dispersants such as certain ashless dispersants containing polar functional groups. Specific examples are triamides of polyisobutenyl propionic acids or long carbon chain esterified alkenyl succinic acids.

Many liquid phases are suitable for the carbon black suspensions of the invention as solvents or diluents for the rubber or other dispersants some, as evident from the examples of suspensions hereinafter described, being preferable to others or essential thereto. Examples of those found most suitable are hydrocarbon solvents, such as dried kerosene, a hydrocarbon having a specific gravity at 60° F. between 0.785 and 0.815; aliphatic solvent #140, a product of Shell Chemical Company, which is a parafinic hydrocarbon solvent having a specific gravity at 60° F. of 0.790, a TTC flash point in ° F. of 140, an aniline point in ° C. of 68.4 and a Kauri-butanol value at 77° F. of 32; #3747 oil, a hydrocarbon oil product of Shell Chemical Company, having a specific gravity at 60° F. of 0.790; a TTC flash point in ° F. of 155, an aniline point in ° C. of 69.0 and a Kauri-butanol value at 77° F. of 30; and Odorless Level Oil, a hydrocarbon oil product of Shell Chemical Company, having a specific gravity at 60° F. of 0.790, a TTC flash point in ° F. of 155, an aniline point in ° C. of 77 and a Kauri-butanol value at 77° F. of 27. Other fluids for the rubber-carbon black master batches and in which the rubber is soluble are the aromatic hydrocarbon solvents such as benzene, toluene, xylene, and p-cymene; also the chlorinated hydrocarbons such as trichloroethylene and chlorobenzene; and the cyclic ketones (a modified hydrocarbon) as cyclohexanone.

As mentioned earlier, solvents having indices of refraction in the order of magnitude of the refractive index of glass (1.51) will reduce minor reflections projected by the glass-fluid interface of the mirror window. The refractive indices of the above solvents at 77° F. for sodium light, which approximates daylight, are as follows: kerosene, 1.45; aliphatic solvent #140, 1.43; #3747 base oil, 1.45; Odorless Level Oil, 1.45; xylene, 1.49; toluene, 1.49; and trichloroethylene, 1.47. The same index of refraction values were obtained using the red-line wave length of an incandescent lamp.

An example of a commercially available "color black" carbon black used in the invention is Neo Spectra Mark II, a product of Columbian Carbon Company, which is a fine channel black having a blackness index of 220, an average particle size of 9 m$\mu$ (milli-microns), a surface area per gram of material of 667 square meters, a DPG absorption index of 98, a pH of 3.0, containing 85.3% of fixed carbon and the balance volatile matter.

In general we prefer a concentration of carbon black not to exceed about 30% by weight of the combined carbon black and dispersant and in the case of rubber type dispersants not more than about 23% by weight thereof, as quantities in excess of these amounts have an undesirable effect on the stability of the final fluid. Depending upon the specific application the amounts of dispersant can be as little as 3% in some cases even 1% by weight but never less than an amount sufficient to provide adequate opacity. Usually between about 3% to 23% of the carbon black is preferred when "color black" carbon black is used with GR-S rubbers and 3% to 12% of "color black" with natural rubber. In these cases the rubber will be substantially completely soluble in the liquid phase. Somewhat larger amounts of carbon black are possible where the processing employed includes a step of filtering off the undissolved particles of compounded rubber.

The following examples of fluid compositions will illustrate the nature of the invention in its broad and specific aspects but are not to be construed as a limitation upon the same:

Example 1

10 g. of carbon black (Neo Spectra Mark II) was milled into 250 g. of uncured rubber GR-S 1703, described above, on an Adamson mill. The carbon black was added to a good rolling bank and the mix was kept cool at all times, i.e. care was taken to prevent excessive heating during the milling process. After all the carbon black had been added, the mixture was milled for an additional 20 minutes to assure a uniform mix. Thereafter 0.96 g. of this freshly-milled master-batch, equivalent to 0.0371 g. of carbon black, was dissolved in 100 ml. of dried kerosene (kerosene previously dried over magnesium perchlorate) by placing these materials in a one-half pint container and shaking the same for three hours on a Red Devil mixer to produce a stable suspension. It was not necessary that material from the master-batch be immediately utilized as tests made with the same indicate that the master-batch has excellent shelf life, it losing only a slight amount of dispersability in kerosene after one year of standing. In making the suspension, it is preferred that the kerosene be dried over night over the magnesium perchlorate before use.

The suspension was tested for opacity by preparing cells thereof 0.018" thick using spaced glass plates so as to form a uniform column of this thickness and the cells inserted between a light source and a photoelectric cell on a Conco-Sheard-Sanford phototelometer, which gives a direct reading on a meter of the percent of light transmitted through the cell. The suspension tested in this manner had a light transmission of 27% through a column of 0.018" thickness.

Sealed cells were also prepared containing the fluid suspension and these were subjected for one month to hot and cold cycling, i.e., repeated exposure for 24 hours at 175° F., then 24 hours at 5° F. There was no indication of any separation of the solids from the liquid phase, no indication of non-uniformity, and the suspension remained fluid. Prepared cells of the suspension were then subjected to a 400-hour exposure to ultra-violet radiation in a dry weatherometer at a temperature between 125° to 140° F. There was no indication of any loss of opacity. The suspension was also exposed to temperature of −40° F. without any harmful effects being indicated. This suspension is considered to be fully commercial for use in a rear view mirror application and to meet all the objectives described above.

Example 2

2 g. of the compounded rubber of Example 1, equivalent to 0.077 g. of carbon black was dissolved in 100 ml. of kerosene as there described and a stable suspension obtained. This suspension had a light transmittance of 7% through a column of fluid suspension 0.018" in thickness. This suspension showed no loss of opacity (no settling) after prolonged cycling between temperatures of 175° and 5° F. nor during 400 hours' exposure at 125° to ultra-violet radiation in a weatherometer.

Example 3

A stable suspension was prepared by dissolving in 100 ml. of kerosene sufficient of the rubber compound of Example 1 to give a stable suspension containing 0.0154 g. of carbon black per 100 ml. of solution. This suspension had a light transmittance of 44% through a column thereof 0.018" in thickness. This suspension showed no loss of opacity (no settling) after prolonged cycling between temperatures of 175° and 5° F. nor during 400 hours' exposure at 125° to ultra-violet radiation in a weatherometer.

Example 4

56.5 g. of Neo Spectra Mark II carbon black was milled into 250 g. of GRS-1703 rubber as described in Example 1, and 0.456 g. of the compounded rubber equivalent to 0.084 g. of carbon black dissolved in 100 ml. of dried kerosene. On test this suspension gave a light transmittance of 8% through a column thereof 0.018" in thickness. This suspension showed no loss of opacity (no settling) after prolonged cycling between temperatures of 175° and 5° nor during 400 hours' exposure at 125° to ultra-violet radiation in a weatherometer.

Example 5

A suspension was prepared as in Example 4, using sufficient of the compounded rubber in 100 ml. of dried kerosene to provide 0.037 g. of carbon black per 100 ml. of solution. The resulting suspension had a light transmittance of 27% through a fluid column of 0.018" thickness. This suspension showed no loss of opacity (no settling) after prolonged cycling between temperatures of 175° and 5° nor during 400 hours' exposure at 125° to ultra-violet radiation in a weatherometer.

Example 6

56.5 g. of carbon black (Neo Spectra Mark II) was milled into 250 g. of uncured GRS-1703 rubber on an Adamson mill as described in Example 1. 0.3646 g. of this freshly-milled master batch equivalent to 0.0672 g. of carbon black was dissolved in 100 ml. of dried kerosene by shaking on a mixer as described in Example 1. A column of the suspension of 0.018" thickness gave on test a light transmittance of 11%. This master-batch was somewhat less stable than that of Example 1, having about ten months' shelf life. After this time, the material became completely insoluble in kerosene. The suspension produced in accordance with this example was given the hot and cold cycle test and ultra-violet test described above in Example 1, and passed these satisfactorily.

Example 7

A stable suspension was prepared from the master-batch of Example 6, using sufficient compounded rubber to give a suspension containing 0.0462 g. of carbon black per 100 ml. of solution. The suspension passed all tests satisfactorily and had a light transmittance on test of a column 0.018" in thickness of 21%.

Example 8

10 g. of carbon black (Neo Spectra Mark II) was milled as described in Example 1 on an Adamson mill into 250 g. of uncured natural rubber (No. 1 Smoked Sheet). 1.546 g. of this freshly-milled master-batch, equivalent to 0.0595 g. of carbon black was dissolved in 100 ml. of dried kerosene, and on test of a column of 0.018" thickness gave a light transmittance of 13%. The suspension passed satisfactorily the hot and cold cycle and ultra-violet test described above.

Example 9

A stable suspension was prepared in accordance with Example 1, utilizing the materials there described but replacing the dry kerosene with the hydrocarbon oil No. 3747, described above, and in the same amount. This formulation passed all hot and cold cycle and ultra-violet tests and gave substantially the same opacity as that obtained with the formulation of Example 1.

Example 10

A composition was prepared in accordance with Example 1, and with the same materials except that the dried kerosene was replaced with aliphatic solvent No. 140 described above, which is a hydrocarbon in which the rubber is soluble. This composition passed all hot and cold cycle and ultra-violet tests described above and provided a fluid with an opacity substantially the same as that for Example 1.

Example 11

A fluid suspension was prepared as in Example 1, and with the same materials except that the dried kerosene was replaced by an equal amount of the hydrocarbon solvent, Odorless Level Oil, described above. This composition produced a satisfactory suspension with an opacity equivalent to that of Example 1, which gave indication of some instability during the hot-cold cycling aging test and, therefore, should preferably be utilized only in those cases where extreme temperature changes are not contemplated.

Example 12

A fluid suspension was prepared as in Example 8, and utilizing the same materials except that the dried kerosene was replaced by a hydrocarbon solvent No. 3747, oil described above. The composition gave an opacity substantially equivalent to that of Example 8, and remained stable in all respects when subjected to the hot and cold cycle aging and ultra-violet test described above.

Example 13

A fluid suspension was prepared in accordance with Example 8, utilizing the same materials except that the dried kerosene solvent was replaced with a hydrocarbon solvent commercially known as aliphatic solvent No. 140, described above. The suspension had an opacity substantially equivalent to that of Example 8, and passed all hot and cold cycle aging and ultraviolet tests described above.

Example 14

A fluid suspension was prepared in accordance with Example 8, using the same materials, except that the dried kerosene solvent was replaced by a hydrocarbon solvent commercially known as Odorless Level Oil, described above. This suspension had an opacity substantially the same as that of Example 8, and passed all hot and cold cycle aging tests. The suspension exhibited some loss of opacity when subjected to the ultraviolet test described above, and therefore should only be employed where a fixed opacity within close limits is essential.

Example 15

10 g. of carbon black (Neo Spectra Mark II) was milled into 250 g. of uncured butyl rubber commercially known as Butyl 400, described above, such milling being carried out on an Adamson mill in accordance with the procedure described in Example No. 1, 1.552 g. of this freshly-milled master batch equivalent to 0.060 g. of carbon black was then dissolved in 100 ml. of a hydrocarbon solvent described above and commercially known as aliphatic No. 140 by shaking to produce a stable suspension. On testing a column of this suspension of 0.018" thickness gave a light transmittance of 37% through the same. It was noted that this suspension was much less opaque per unit weight of carbon black than the previously described compositions in which natural rubber or a copolymer of butadiene and styrene were employed. This suspension gave indications of some instability during the hot and cold cycle aging test and is, therefore, recommended for use for those applications where extreme changes in temperature are not contemplated.

Some further examples of stable suspensions of carbon black particles utilizing other rubber dispersants than in the above examples and other solvents are as follows:

Example 16

4 g. of carbon black (Neo Spectra Mark II) was milled into 100 g. of an uncured acrylic rubber, Hycar 4021, a product of B. F. Goodrich Chemical Company, on a rubber mill. 0.854 g. of this freshly milled master batch, equivalent to 0.0329 g. of carbon black, was placed with 100 ml. of trichloroethylene in a ½ pint can and shaken on a Red Devil mixer for 3 hours. The rubber was completely dissolved and gave a satisfactory suspension.

Example 17

0.871 g. of the freshly milled master batch of Example 16, equivalent to 0.0335 g. of carbon black, was processed as in Example 16 using 100 ml. of toluene as the solvent for the rubber and liquid phase. It produced a satisfactory suspension.

Example 18

4 g. of carbon black (Neo Spectra Mark II) was milled into 100 g. of an uncured butadiene-acrylonitrile rubber, Hycar 1051, a product of B. F. Goodrich Chemical Company, on a rubber mill. 0.868 g. of this freshly-milled master batch, equivalent to 0.0334 g. of carbon black, was placed with 100 ml. of trichloroethylene in a ½ pint can and shaken on a Red Devil mixer for 3 hours. The rubber was completely dissolved and gave a satisfactory suspension.

Example 19

0.872 g. of the freshly milled master batch of Example 18, equivalent to 0.0336 g. of carbon black, was processed as in Example 18, using 100 ml. of toluene as the rubber solvent and liquid phase. It was found that all of the rubber did not dissolve the undissolved portion settling to the bottom. The portion which dissolved produced a good suspension but contained less than the calculated concentration of carbon black. It was possible to filter off the undissolved portion.

Example 20

4 g. of carbon black (Neo Spectra Mark II) was milled into 100 g. of uncured chlorosulfonated polyethylene rubber, Hypolon 40, a product of E. I. du Pont, on a rubber mill. 0.865 g. of this freshly-milled master batch, equivalent to 0.0333 g. of carbon black, was placed with 100 ml. of trichloroethylene in a ½ pint can and shaken on a Red Devil mixer for 3 hours. The rubber was completely dissolved and gave a satisfactory suspension.

Example 21

0.887 g. of the freshly milled master batch of Example 20, equivalent to 0.0341 g. of carbon black, was processed as in Example 20, using 100 ml. of toluene as the solvent for the rubber and liquid phase. The rubber was completely soluble in the toluene and produced a satisfactory suspension.

Example 22

4 g. of carbon black (Neo Spectra Mark II) was milled in 100 g. of an uncured urethane rubber, Genthane S, a product of General Tire and Rubber Company, on a rubber mill. 0.887 g. of this freshly-milled master batch, equivalent to 0.0341 g. of carbon black, was placed with 100 ml. of trichloroethylene in a ½ pint can and shaken on a Red Devil mixer for 3 hours. The rubber was completely dissolved and gave a satisfactory suspension.

In connection with the above examples employing a compounded rubber in the preparation of the opaque fluid suspension, it has been found that the optical density of the fluid may be somewhat improved without affecting the stability of the suspension by filtering the compositions to remove undesirable coarse particles, particularly the solvent insoluble part of the rubber which coarser aggregates sometimes tend to settle rapidly and form a sludge.

Attempts to utilize other dispersants than rubber for the carbon black have met with limited success insofar as producing a stable suspension for rear view mirror applications. Many different dispersants have been tried, some of which are described below. At least two have produced excellent results and others while susceptible to producing a suspension of desired opacity did not provide suspensions sufficiently stable for commercial applications of this character. These however have applications where the requirements are not as stringent.

Example 22A 0.3 g. of carbon black (Neo Spectra Mark II) was mulled with a mortar and pestle into 3.5 g. of ashless dispersant additive consisting of a pourable concentrate of 1.75 g. of a light mineral lubricating oil and 1.75 g. of active ingredient which is a triamide of polyisobutenyl propionic acid. This mx was added to 500 ml. of Odorless Level Oil and stirred for several minutes with a high-speed stirrer (Eppenbach). The resulting suspension was added to 500 ml. of Odorless Level Oil circulating in a Gaulin Laboratory Homogenizer (Model 15 M8TA SMD) where it was processed for four (4) minutes at 8000 p.s.i. The resultant opaque fluid is an adequately stable suspension for mirror application providing non-staining properties where used therein and met all hot and cold cycle and ultraviolet tests described in Example 1. When tested for opacity in the manner described in Example 1, the suspension had a light transmission of 35% through a column of 0.018″ thickness.

The above concentrate has a specific gravity at 60/60° F. of 0.907, a viscosity @ 210° F. of 300 cs.; a flash point in ° F. of 385, and contains 1.1 weight percent of nitrogen. The active ingredient thereof is prepared by bubbling chlorine gas through polyisobutylene having a molecular weight of about 950 to chlorinate the same, then condensing it with acrylic acid to form polyisobutenyl propionic acid, and then condensing 3 moles of the polyisobutenyl propionic acid with 1 mole of tetraethylene pentamine while removing 3 moles of water to thereby form the triamide.

Example 22B

A composition was prepared in accordance with Example 22A, utilizing the materials there described but replacing the concentrate called for therein by 3.5 g. of an ashless dispersant additive consisting of a 65 carbon alkenyl succinic acid esterified with a penta hydroxy glycol. The additive has a specific gravity at 60° F. of 0.930 and a viscosity at 210° F. of 637 SUS. The opaque fluid is an adequately stable suspension for mirror application providing non-staining properties when used therein and met all hot and cold cycle and ultraviolet tests described in Example 1. When tested for opacity in the manner described in Example 1, this suspension had a light transmission of 33% through a column of 0.018″ thickness.

Example 23

Dissolved 0.27 g. of a commercial concentrated dispersion of carbon black known as Aqua Black K, a product of the Columbian Carbon Company, in 100 ml. of a 60 to 40 mixture of glycol and water together with 2 g. per 100 ml. of the glycol water mixture of a dispersant known commercially as Daxad 11, which is composed of sodium salts of polymerized alkyl naphthalene sulfonic acids and a product of W. R. Grace & Company. A carbon black suspension prepared in this manner when tested for opacity showed a light transmittance of well below 10% through a column of the suspension 0.060″ thick. The suspension did not have the stability of the composition described in Example 1 and, therefore, is preferably not employed where extreme temperature changes and ultraviolet conditions exist.

Example 24

The following were placed in a ½ pint can: 0.080 g. of carbon black (Neo Spectra Mark II which had been dried at 160° C. for 3 hours), 50 g. of dry silica sand, 100 ml. of dried kerosene and 1 g. of lube oil additive No. 564, a product of Du Pont Company. This mixture was shaken on a Red Devil mixer for 8 hours and filtered to remove the sand. A carbon black suspension prepared in this manner when tested for opacity showed a light transmittance of 23% through a column of suspension 0.018" thick. This suspension did not have the stability of the composition described in Example 1 and, therefore, is preferably not employed where extreme temperature changes and ultra-violet conditions exist.

The lube oil additive No. 564 is a viscous, straw colored, mildly basic, ashless polymeric liquid detergent having a density of 7.5 lbs./gal., a viscosity at 100° F. of 900 SUS and 212° F. of 1200. It is a 40% active ingredient solution in a light solvent extracted neutral oil, the active ingredient being a methacrylate copolymer in which nitrogen has been incorporated into the molecule and having the general structure

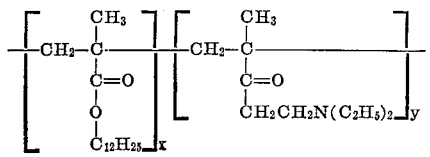

It is understood to be a copolymer of lauryl methacrylate and diethylaminoethyl methacrylate.

Example 25

The following were placed in a ½ pint can: 0.08 g. of carbon black (Neo Spectra Mark II which had been dried at 160° C. for 3 hours), 50 g. of dry silica sand, 100 ml. of dried kerosene and 1 g. of fuel oil additive No. 2, a product of Du Pont Company. This mixture was shaken on a Red Devil mixer for 8 hours and filtered to remove the sand. A carbon black suspension prepared in this manner when tested for opacity showed a light transmittance of 19% through a column of suspension 0.018" thick. This suspension did not have the stability of the composition described in Example 1 and, therefore, is preferably not employed where extreme temperature changes and ultraviolet conditions exist.

Fuel oil additive No. 2 is a viscous light-amber liquid composed of 50% of an active ingredient in kerosene. It has a density at 60° F. of 0.902 gm./ml., a viscosity at 100° F. of 1525 SUS and 305 at 210° F. The active ingredient is a long chain methacrylate copolymer of several completely organic compounds (3 monomers) containing polar-active and oil-soluble groupings and having an average molecular weight of about 50,000.

Although the foregoing novel opaque stable fluid compositions have been developed for the purposes of rear view mirrors such as described in said Platzer-Gau application aforesaid, it will be appreciated that they may be used for example in connection with flood lights as a light dimming source and as manometer or gauge fluids. In connection with their use with rear view mirrors it may be noted that in a typical satisfactory fluid type rear view mirror of the Platzer-Gau type having a fluid layer of 0.0015" in the bright or daylight position and a fluid layer of 0.125" in the extinct or night position the opacity of the fluid should preferably be such that about 85% as much light or more will be reflected by the mirror in the daylight position with the fluid as would be reflected by a mirror without the fluid. In some cases as where the mirror efficiency is relatively high a somewhat lower percentage of reflectivity for instance as low as 70% may be tolerated. Similarly the mirror with the fluid should reflect only about 0.00000125% as much light in the night position as a mirror containing no fluid.

The following sets forth the amount in grams of the various master batches described in certain of the above examples which when dissolved in 100 milliliters of solvent will provide a stable fluid having an optical density meeting the previously stated desired conditions for a typical rear view mirror. It will be evident that in all cases the concentration of combined carbon black and dispersant in the suspension is no greater than about 1% by weight.

0.832 gm. of master batch containing 3.8% carbon black.—Examples 1, 2 and 3.
0.174 gm. of master batch containing 18.5% carbon black.—Examples 4, 5, 6 and 7
0.832 gm. of master batch containing 3.85% carbon black.—Examples 8, 9, 10, 11, 12, 13 and 14

From the above description of our invention it will be evident that we have provided unique opaque fluid composition suitable for rear view mirror and other commercial applications and processes of making the same. It will be understood that the examples given are exemplary only and not by way of limitation it being apparent that various modifications and changes will suggest themselves to those skilled in the art without departing from the spirit and intent of our invention.

We claim:
1. A light absorbing fluid for optical structures and the like consisting essentially of a substantially stable colloidal suspension of carbon black particles of an average size under twenty milli-microns dispersed in a liquid phase which is a solution of an organic liquid selected from the group consisting of aromatic hydrocarbons, halogenated hydrocarbons, aliphatic hydrocarbons, and cyclic ketones and mixtures thereof and a dispersing agent associable with the carbon black particles as a surface active substance and serving as a stabilizer for the colloidal suspension, said dispersing agent being selected from the group consisting of uncured rubber, methacrylate copolymers, and condensation products of high molecular weight carboxylic acid with a reactant selected from the group consisting of polyamines and glycols and mixtures thereof, the amount of carbon black particles in said suspension not exceeding about 30% by weight of the carbon black particles and dispersing agent combined.

2. A light absorbing fluid as claimed in claim 1, wherein the dispersing agent is uncured rubber and the amount of carbon black particles in the suspension does not exceed about 23% by weight of the carbon black particles and dispersing agent combined.

3. A light absorbing fluid as claimed in claim 2, wherein the uncured rubber is selected from the group consisting of GR-S rubber, butyl rubber, natural rubber, polyacrylic rubber, Buna N rubber, chlorosulfonated polyethylene rubber, urethane rubber, polyisoprene rubber, isobutylene polymer rubber, and mixtures thereof.

4. A light absorbing fluid as claimed in claim 2, wherein the uncured rubber is selected from the group consisting of GR-S rubber, and natural rubber and mixtures thereof.

5. A light absorbing fluid as claimed in claim 2, wherein the dispersing agent is uncured GR-S rubber and the organic liquid is kerosene and wherein the ratio of carbon black particles to combined carbon black particles and rubber by weight is between about 3% to 23%.

6. A light absorbing fluid as claimed in claim 2, wherein the dispersing agent is uncured natural rubber and the organic liquid is kerosene and wherein the ratio of carbon black particles to combined carbon black particles and rubber by weight is between about 3% to 12%.

7. A light absorbing fluid as claimed in claim 2, wherein the rubber is a GR-S rubber, the organic liquid is kerosene and wherein each 100 milli-liters of kerosene contains between about 0.8 to 0.9 gram of combined carbon black and rubber of which about 3.8% to 3.9% is carbon black.

8. A light absorbing fluid as claimed in claim 2, wherein the rubber is a GR-S rubber and wherein each 100 milli-liters of organic liquid contains between about 0.17 to about 0.84 gram of combined carbon black and rubber of which between about 3.85% to 18.5% by weight is carbon black.

9. A light absorbing fluid as claimed in claim 1, wherein the organic liquid is selected from the group consisting of kerosene, benzene, toluene, xylene, cymene, decane, dodecane, trichloroethylene, chlorobenzene, and cyclohexanone and mixtures thereof.

10. A light absorbing fluid as claimed in claim 1, wherein the dispersing agent is a condensation product of a high molecular weight carboxylic acid with a reactant selected from the group consisting of polyamines and glycols and mixtures thereof.

11. A light absorbing fluid as claimed in claim 1, wherein the organic liquid is kerosene.

12. A light absorbing fluid as claimed in claim 1, wherein the dispersing agent is a triamide of polyisobutenyl propionic acid.

13. A light absorbing fluid as claimed in claim 1, wherein the dispersing agent is a long carbon chain alkenyl succinic acid esterified with a penta hydroxy glycol wherein the number of carbon atoms in the alkenyl chain is approximately 65.

14. A light absorbing fluid as claimed in claim 1, wherein the organic liquid has an index of refraction between 1.4 and 1.6.

15. A light absorbing fluid as claimed in clam 14, characterized in that a layer thereof of about 0.0015" thickness will permit the passage of a beam of light of twenty foot candles without a loss by absorption of more than about 15% and in that a layer thereof of about 0.125" thickness will absorb at least 96% of the light of said beam.

16. A light absorbing fluid as claimed in claim 1, wherein the dispersing agent is a methacrylate copolymer in which nitrogen has been incorporated in the molecule.

17. A method of making a light absorbing fluid for optical structures comprising milling carbon black comprising agglomerates of individual particles with a dispersing agent selected from the group consisting of uncured rubber, methacrylate copolymers and condensation products of high molecular weight carboxylic acid with a reactant selected from the group consisting of polyamines and glycols and mixtures thereof, agitating the carbon black and agent in an organic liquid which is a diluent for the agent and which is selected from the group consisting of aromatic hydrocarbons, halogenated hydrocarbons, aliphatic hydrocarbons and cyclic ketones and mixtures thereof, continuing said agitation sufficiently to produce a substantially stable colloidal suspension of carbon black particles of an average size under twenty millimicrons in said liquid and in which said agent is associated with said carbon black particles as a surface active agent, the amount of carbon particles in said suspension not exceeding about 30% by weight of the carbon black particles and dispersing agent combined.

18. The method as claimed in claim 17, wherein the dispersing agent is a methacrylate copolymer in a solvent extracted neutral hydrocarbon oil and the organic liquid is selected from the group consisting of aliphatic and aromatic hydrocarbons and mixtures thereof.

19. The method as claimed in claim 17, wherein the dispersing agent is a triamide of polyisobutenyl propionic acid.

20. The method as claimed in claim 17, wherein the dispersing agent is a long carbon chain alkenyl succinic acid esterified with a penta hydroxy glycol wherein the number of carbon atoms in the alkenyl chain is approximately 65.

21. A method of making a light absorbing fluid for optical structures comprising milling carbon black comprising agglomerates of individual particles into uncured rubber sufficiently to disperse the agglomerates into the rubber substantially as individual particles of carbon black of an average size under twenty millimicrons, adding the compounded rubber to an organic liquid which is a solvent for the rubber and which is selected from the group consisting of aromatic hydrocarbons, halogenated hydrocarbons, aliphatic hydrocarbons and cyclic ketones and mixtures thereof and agitating the composition to dissolve the rubber and produce a substantially stable colloidal suspension of said carbon black particles in said liquid in which the rubber is associated with the carbon black particles as a surface active agent, the amount of carbon black particles in said suspension not exceeding about 23% by weight of the carbon black particles and rubber combined.

22. The method as claimed in claim 21, wherein the carbon black is milled into the rubber to form a sheet in which the carbon black is dispersed substantially uniformly therethrough as individual particles and cutting the sheet into small portions before adding it to the organic liquid.

23. The method as claimed in claim 21, wherein the rubber is uncured GR–S rubber and the carbon black particles are present in amount by weight between about 3% to 23% of the carbon black particles and rubber combined.

24. The method as claimed in claim 21, wherein the rubber is uncured natural rubber and the carbon black particles are present in amount by weight between about 3% to 12% of the carbon black particles and rubber combined.

25. The method as claimed in claim 21, wherein the uncured rubber is selected from the group consisting of GR–S rubber, butyl rubber, natural rubber, polyacrylic rubber, Buna N rubber, chlorosulfonated polyethylene rubber, urethane rubber, polyisoprene rubber, isobutylene polymer rubber and mixtures thereof.

26. A method of making a light absorbing fluid comprising agitating a mixture of carbon black comprising agglomerates of individual particles, dry silica sand, a liquid hydrocarbon selected from the group consisting of aliphatic and aromatic hydrocarbons and mixtures thereof and a solvent extracted hydrocarbon neutral oil containing as an active ingredient a methacrylate copolymer in which nitrogen has been incorporated into the molecule, continuing said agitation sufficiently to produce a substantially stable colloidal suspension of carbon black particles of an average size under twenty milli-microns in the liquid ingredients and filtering the suspension to remove the sand, the amount of carbon black particles in said suspension not exceeding about 30% by weight of the carbon black particles and said active ingredient combined.

References Cited

UNITED STATES PATENTS

| | | | |
|---|---|---|---|
| 1,824,771 | 9/1931 | Cox | 252—300 |
| 2,706,262 | 4/1955 | Barnes | 313—92 |
| 2,771,458 | 11/1956 | Van Gilder et al. | 260—33.6 |
| 3,000,262 | 9/1961 | Rabinow et al. | 350—283 |
| 3,007,891 | 11/1961 | Gerstenberg et al. | 260—40 |

FOREIGN PATENTS 592,974  2/1960  Canada.

RICHARD D. LOVERING, Primary Examiner

U.S. Cl. X.R.

106—307; 260—33.6; 350—283, 312